Aug. 16, 1966    J. ANDERSON    3,266,403
COMBINED SUPPORT AND CARRIER FOR CAMERAS
Filed March 13, 1964    2 Sheets-Sheet 1
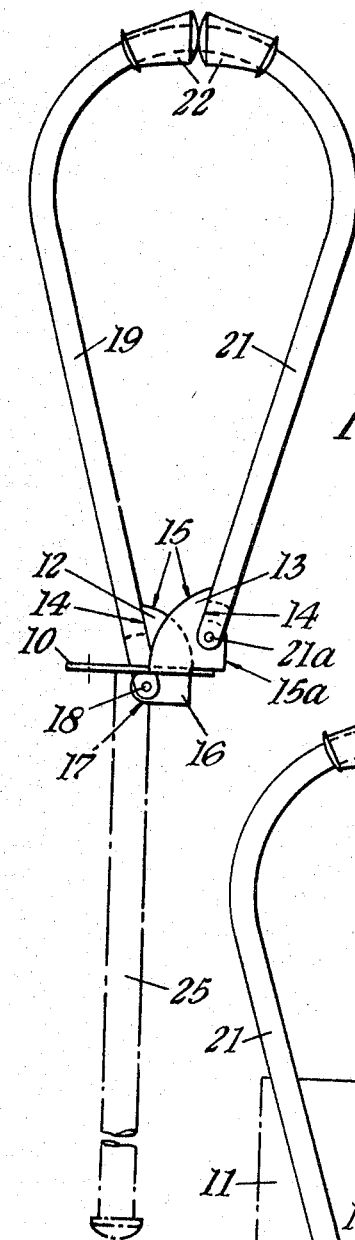
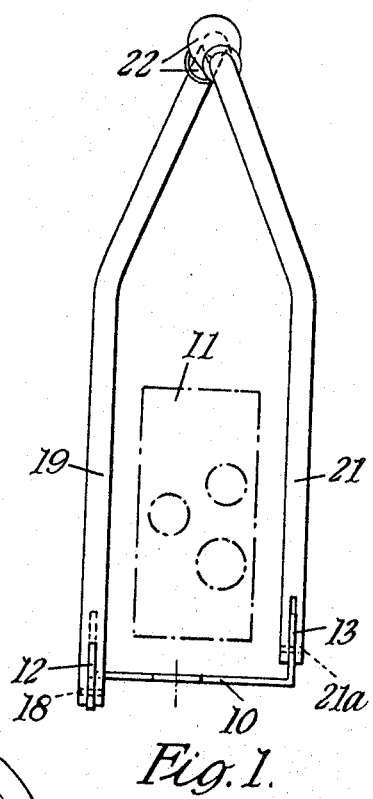
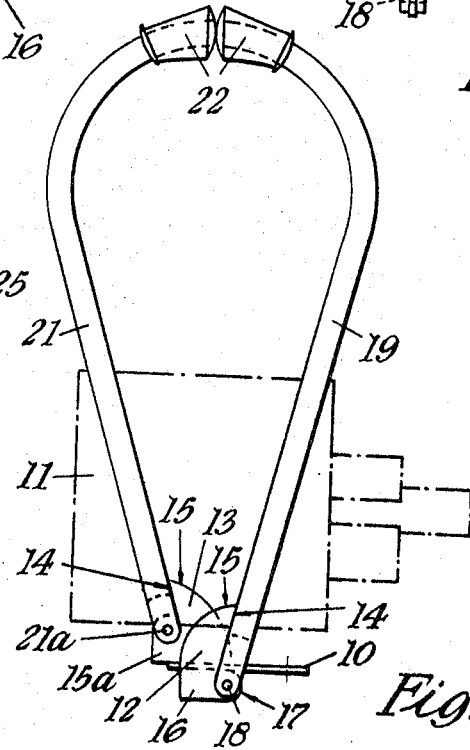

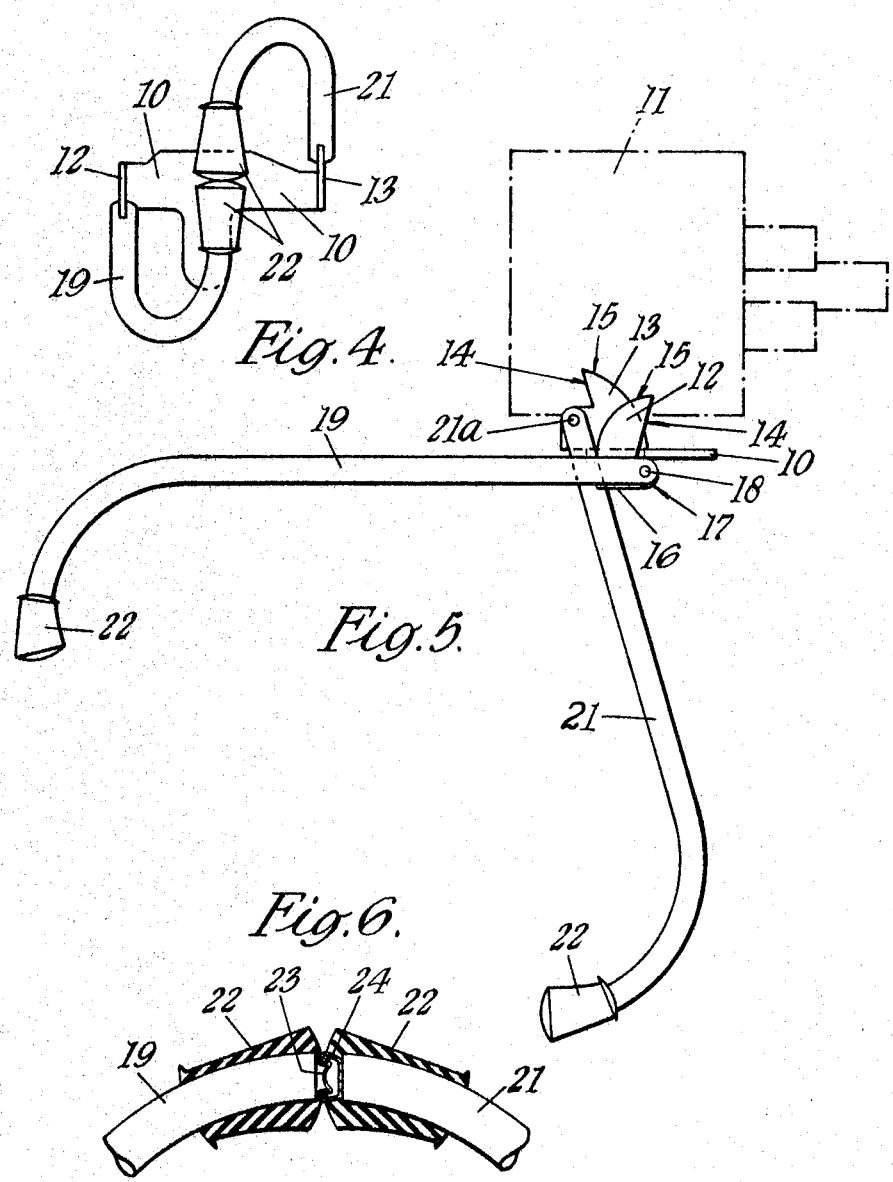

United States Patent Office 3,266,403
Patented August 16, 1966

3,266,403
COMBINED SUPPORT AND CARRIER
FOR CAMERAS
James Anderson, Glasgow, Scotland, assignor to Imex Engineering Limited, Glasgow, Scotland, a British company
Filed Mar. 13, 1964, Ser. No. 351,613
Claims priority, application Great Britain, Mar. 15, 1963, 10,302/63
3 Claims. (Cl. 95—86)

This invention consists in a combined support and carrier for cine-cameras which are usually supported by the hands or by the hands in combination with a unipod.

In using such cine-cameras it is desirable that all movement thereof should be reduced to a minimum.

It has been found that the chief movement of such cine-cameras is about the vertical axis of the camera and that, because of this, the provision of a piston grip or a unipod to support the camera does not substantially reduce such movement.

The present invention has for its object to provide supports for cine-cameras of the kind which are usually supported by the hands or by a unipod or both which will substantially eliminate movement thereof when the camera is in use and which will also serve as a carrier for the camera.

According to the present invention a combined support and carrier for a cine-camera comprises a base on which the cine-camera can be mounted, two legs pivoted one at each side of the base, each leg at its free end being of substantially quarter circle formation so that the said ends, when the legs are in their upright position with respect to the base, cooperate to form the upper end of a loop handle by which the base with cine-camera thereon can be carried, one of the legs being capable of a rotary movement in one direction from its upright position so that it will extend substantially in the plane of the base and is then positioned to hook over the shoulder, and the other leg being capable of a rotary movement in the opposite direction so that it can be turned to extend downwards and is then positioned to bear on the body in proximity to the bottom rib, the base, when the arms engage the shoulder and body, being then so supported that the cine-camera mounted thereon is positioned for operation, means by which both legs are prevented from rotating beyond their aforesaid upright positions, means by which the first-mentioned leg is prevented from rotating beyond the position in which it extends substantially in the plane of the base and means by which the other leg is prevented from rotating beyond its downwards position. When the cine-camera is so supported the operator has both hands free to operate the camera and movement of the camera about its vertical axis can be reduced to substantially nil.

The pivotal axis of one of the legs may be located in advance of the pivotal axis of the other leg and the curved end of the legs off-set so that when the legs are in their upright positions said ends will register to form the loop handle.

Preferably the leg with curved end which fits over the shoulder extends below and bears on the base when in its camera supporting position while the pivoted end of the other leg, when turned downwards, bears against an abutment or the like to prevent outward movement relative to the body.

The invention will now be described with reference to the accompanying drawings wherein:

FIGURE 1 is an elevation of a preferred embodiment of the improved camera support and carrier with the two legs in their camera carrying position;

FIGURE 2 is an end elevation of FIGURE 1 looking to the left;

FIGURE 3 is an end elevation of FIGURE 1 looking to the right;

FIGURE 4 is a plan view of FIGURE 1;

FIGURE 5 is a view corresponding to FIGURE 3 but showing the legs in the position which they occupy when supporting the camera in taking photographs or shots; and FIGURE 6 shows to a larger scale the free ends of the legs in section when interconnected to form a loop handle.

As shown in the drawings the improved combined support and carrier is provided with an elongated base 10 and the camera, indicated in dotted lines 11, can be anchored thereon by means of a stud inserted through a hole in the base and screwed into the camera. The base is provided with two upright lugs 12 and 13 positioned one at each end of the base, each lug having a straight edge 14 and an arcuate edge 15. It will be noted that the two straight edges face in opposite directions.

Lug 12 has a downward extension 16 with outwardly projecting toe 17. To the toe is pivoted at 18 a leg 19 which has a saw-cut to accommodate the toe. The other lug 13 projects outwardly from the base in the opposite sense to the toe 17 and where it projects it forms the straight edge 15 and below said edge it projects to form a second toe 15a to which the second leg 21 is pivoted at 21a. Leg 21 has a saw-cut to accommodate the toe 15a.

Both legs are bent or off-set with respect to each other so that their free ends are of substantially quarter circular formation and so that the extremities of said ends, when the legs are erected to form a loop handle, register with each other as shown in FIGURES 1, 2, 3, 4 and 6. The said ends are shown provided with rubber sleeves 22 one of which has a stud 23 and the other a socket 24, the stud and socket forming a spring catch, see FIGURE 6.

In using the device as a carrier for the camera the two legs are turned to their upright positions and are interconnected at their free ends by the spring catch. When so erected the legs abut against the upper ends of the straight edges 14 of the lugs so that the base is rigid with respect to the legs.

The legs, when erected, form a loop handle so that the device becomes a carrier for the camera and gives a degree of protection thereto.

When it is desired to use the camera the leg 19 is turned about its pivot in a clockwise direction, as viewed in FIGURE 3, through an angle of about 270°, the leg then abutting against the underface of the base to prevent further movement, see FIGURE 5. The leg 21 is turned about its pivot in a counter-clockwise direction as viewed in FIGURE 3, through an angle of about 180°. The leg in this position is also shown in FIGURE 5. The movement of this leg is restricted by the leg abutting against the base. Thus the two legs are at an angle of about 90° to each other and when in such position the free end of the leg 19 can be passed over the shoulder to bear on the shoulder blade and the other leg is then so positioned that its free end bears on or about the bottom rib.

The camera is thereby so supported that it is in a position in which the view finder is positioned convenient to the eye and the hands are free to operate it.

In preference the operator, when using the camera, should lean backwards on a suitable fixture, a wall for example, to give added rigidity to the camera.

The device may be provided with a unipod to give additional support thereto, the unipod, designated 25, being indicated in dotted lines in FIGURE 2.

What I claim is:
1. A combined support and carried for a cine-camera comprising a base on which the cine-camera can be mounted, two legs pivoted one at each side of the base, each leg at its free end being of substantially quarter circle formation and curved in opposite directions so that said ends, when the legs are in their upright position with respect to the base, register with each other to form the upper end of a loop handle by which the base with cine-camera thereon can be carried, said loop handle being disposed in a plane at substantially right angles to the plane in which said legs pivot, one of the legs being capable of a rotary movement in one direction from its upright position so that it will extend substantially in the plane of the base and is then positioned to hook over the shoulder, and the other leg being capable of a rotary movement in the opposite direction so that it can be turned to extend downwards and is then positioned to bear on the body in proximity to the bottom rib, the base, when the arms engage the shoulder and body, being then so supported that the cine-camera mounted thereon is positioned for operation, stop means by which both legs are prevented from rotating beyond the position in which it tion, stop means by which the first-mentioned leg is prevented from rotating beyond their aforesaid upright position extends substantially in the plane of the base and stop means by which the other leg is prevented from rotating beyond its downwards position.

2. A combined support and carrier for a cine-camera as claimed in claim 1 wherein the pivotal axis of one of the legs is located in advance of the pivotal axis of the other leg and the curved ends of the legs off-set so that when the legs are in their upright positions said ends will register to form the loop handle.

3. A combined support and carrier for a cine-camera as claimed in claim 1 wherein the leg with curved end which fits over the shoulder extends below and bears on the base when in its camera supporting position while the pivoted end of the other leg, when turned downwards bears against an abutment to prevent outward movement relative to the body.

References Cited by the Examiner
UNITED STATES PATENTS
896,269   8/1908   Birdwell _____ 95—86

JOHN M. HORAN, *Primary Examiner.*